(12) United States Patent
Cao et al.

(10) Patent No.: US 10,996,358 B2
(45) Date of Patent: May 4, 2021

(54) IMAGE-GUIDED VELOCITY INTERPOLATION USING A MASK CUBE

(71) Applicant: Saudi Arabian Oil Company, Dhahran (SA)

(72) Inventors: Lei Cao, Beijing (CN); Jiarui Yang, Beijing (CN); Xiongwen Wang, Beijing (CN); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 452 days.

(21) Appl. No.: 15/680,767

(22) Filed: Aug. 18, 2017

(65) Prior Publication Data

US 2019/0056520 A1 Feb. 21, 2019

(51) Int. Cl.
*G01V 1/34* (2006.01)
*G01V 1/30* (2006.01)
*G06F 17/16* (2006.01)

(52) U.S. Cl.
CPC ............. *G01V 1/345* (2013.01); *G01V 1/303* (2013.01); *G01V 2210/6222* (2013.01); *G01V 2210/66* (2013.01); *G06F 17/16* (2013.01)

(58) Field of Classification Search
CPC .... G01V 1/303; G01V 1/345; G01V 2210/66; G01V 2210/6222; G06F 17/16
See application file for complete search history.

(56) References Cited

U.S. PATENT DOCUMENTS

| | | | |
|---|---|---|---|
| 8,521,437 B2 | 8/2013 | Moore | |
| 8,576,662 B2 | 11/2013 | Christie | |
| 10,445,862 B1 * | 10/2019 | Merry | ..................... G06T 7/251 |
| 2010/0114495 A1 * | 5/2010 | Al-Saleh | .................. G01V 1/34 |
| | | | 702/17 |
| 2011/0205844 A1 | 8/2011 | Maucec et al. | |
| 2014/0029383 A1 * | 1/2014 | Dasgupta | ............... G01V 1/303 |
| | | | 367/73 |
| 2016/0086079 A1 * | 3/2016 | De Stefano | ............. G06N 3/08 |
| | | | 706/12 |
| 2016/0216390 A1 | 7/2016 | Favreau et al. | |
| 2017/0131418 A1 * | 5/2017 | Wang | ..................... G01V 1/282 |

OTHER PUBLICATIONS

Fehmers et al., "Fast structural interpretation with structure-oriented filtering," Geophysics, vol. 68, No. 4, Jul.-Aug. 2003; pp. 1286-1293.

(Continued)

*Primary Examiner* — Stephanie E Bloss
(74) *Attorney, Agent, or Firm* — Fish & Richardson P.C.

(57) ABSTRACT

The present disclosure describes methods and systems, including computer-implemented methods, computer program products, and computer systems, for image-guided velocity interpolation using a mask cube. One computer-implemented method includes generating a 3D array of velocities, generating a mask for the 3D array of velocities, each value in the 3D array of velocities associated with a corresponding value in the mask, calculating a 3D array of diffused velocities by applying structure oriented smoothing to the 3D array of velocities, calculating a diffused mask by applying the structure oriented smoothing to the mask, and calculating interpolated velocity values based on the 3D array of diffused velocities and the diffused mask.

12 Claims, 5 Drawing Sheets

(56) References Cited

OTHER PUBLICATIONS

Hale, "Structure-oriented smoothing and semblance," 2009, Center for Wave Phenomena (CWP) Report 635; pp. 261-270.
Hale, "Image-guided 3D interpolation of borehole data," SEG Denver Annual Meeting 2010, Expanded Abstracts; pp. 1266-1270.
Swindeman et al., "Seismic data interpolation using plane-wave shaping regularization," SEG New Orleans Annual Meeting 2015, Expanded Abstracts; pp. 3853-3858.
Yao et al., "Fast 3D kriging interpolation using Delaunay tetrahedron with CUDA-enabled GPU," SEG New Orleans Annual Meeting 2015, Expanded Abstract; pp. 1739-1743.
Chen et al., "High-fidelity full-waveform inversion with an initial velocity model from multiple wells interpolation," SEG Technical Program Expanded Abstracts 2016+ Presentation, Method—Well Log interpolation of velocity structure, Oct. 19, 2016, 49 pages.
Naeini et al., "Image-and horizon-guided interpolation," Geophysics vol. 80, No. 3, May 1, 2015, 10 pages.
International Search Report and Written Opinion issued in International Application No. PCT/US2018/046887 dated Dec. 6, 2018, 15 pages.
GCC Examination Report in GCC Appln. No. GC 2018-35876, dated Feb. 5, 2020, 4 pages.
GCC Examination Report in GCC Appln. No. GC 2018-35876, dated May 16, 2020, 4 pages.
EPO Communication Pursuant to Article 94(3) in European Appln. No. 18769890.7-1001, dated Dec. 15, 2020, 6 pages.

* cited by examiner

Interpolation-horizon

Interpolation-structure

IMAGE-GUIDED VELOCITY INTERPOLATION USING A MASK CUBE

TECHNICAL FIELD

This disclosure relates to velocity interpolation and, more specifically, to image-guided velocity interpolation using a mask cube.

BACKGROUND

Wave propagating velocities in earth subsurface layers are important for seismic imaging. Accurate velocities increase accuracy of structure interpretation and reliability of stratigraphy analyzing. In practice, velocities are often estimated on sparse locations where common image gathers (CIG) or common depth point (CDP) gathers are analyzed. The estimated velocities at sparse locations can be interpolated to every spatial location.

SUMMARY

The present disclosure describes methods and systems, including computer-implemented methods, computer program products, and computer systems for image-guided velocity interpolation using a mask cube. One computer-implemented method for image-guided velocity interpolation using a mask cube includes generating a 3D array of velocities, generating a mask for the 3D array of velocities, each value in the 3D array of velocities associated with a corresponding value in the mask, calculating a 3D array of diffused velocities by applying structure oriented smoothing to the 3D array of velocities, calculating a diffused mask by applying the structure oriented smoothing to the mask, and calculating interpolated velocity values based on the 3D array of diffused velocities and the diffused mask.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each, optionally, include one or more of the following features, alone or in combination:

A first aspect, combinable with the general implementation, comprising, calculating structure tensors from one or more seismic images.

A second aspect, combinable with any of the previous aspects, wherein the structure oriented smoothing comprises solving an anisotropic diffusion equation based on the calculated structure tensors.

A third aspect, combinable with any of the previous aspects, wherein the interpolated velocity values are calculated by point-to-point dividing of the 3D array of diffused velocities over the diffused mask.

A fourth aspect, combinable with any of the previous aspects, comprising, receiving sparsely sampled velocity values.

A fifth aspect, combinable with any of the previous aspects, wherein the 3D array of velocities is generated based on the received sparsely sampled velocity values, and values in the 3D array of velocities are set to zero at locations where velocity values are not sampled.

A sixth aspect, combinable with any of the previous aspects, wherein a value in the mask is set to zero when a corresponding value in the 3D array of velocities is zero, or to one when the corresponding value in the 3D array of velocities is not zero.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
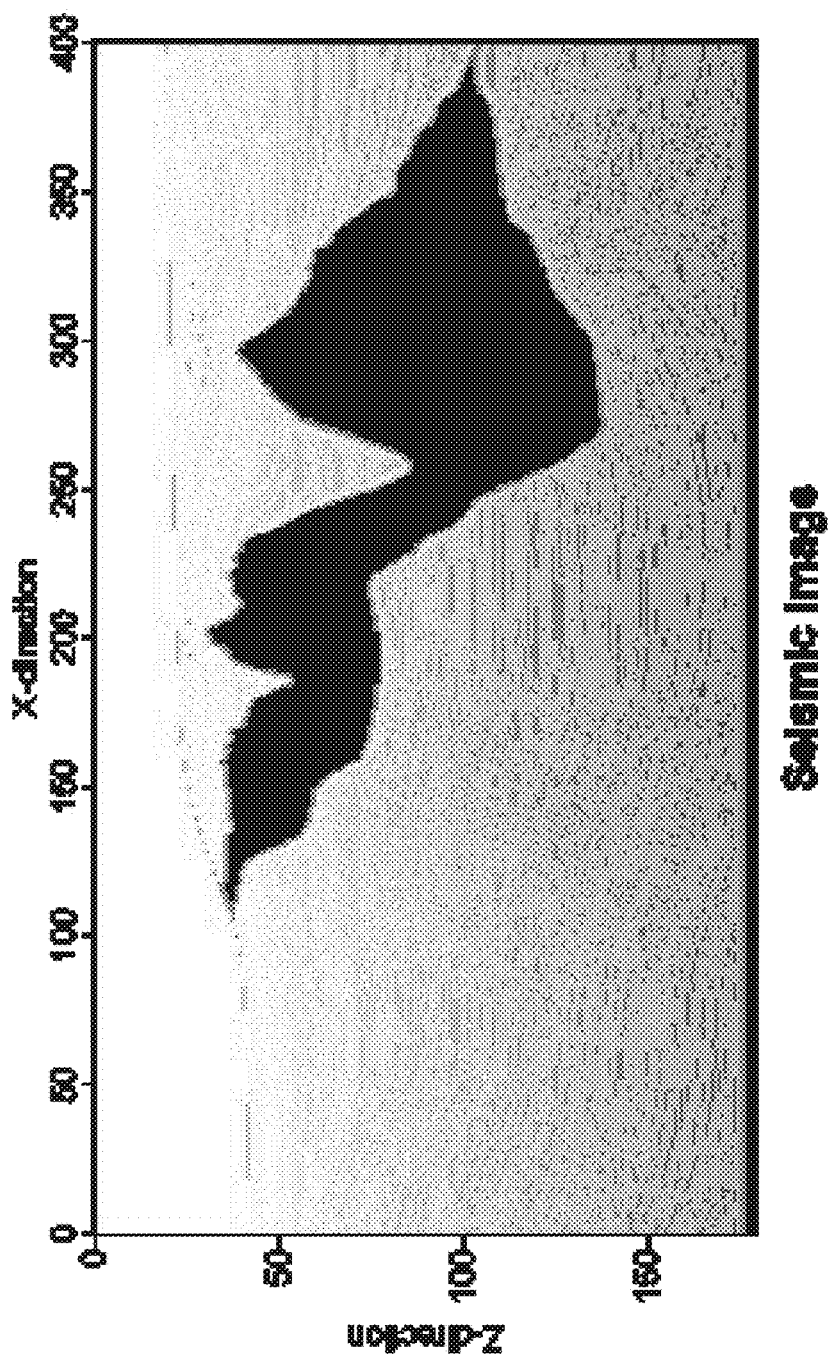
FIG. 1 illustrates an example seismic image for image-guided velocity interpolation, according to some implementations.

The following detailed description describes a method to interpolate velocity along structure trends shown in seismic image(s) and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

Wave propagating velocities in earth subsurface layers are important for seismic imaging. Accurate velocities increase accuracy of structure interpretation and reliability of stratigraphy analyzing. In practice, velocities are often estimated on sparse locations where common image gathers (CIG) or common depth point (CDP) gathers are analyzed. The estimated velocities at the sparse locations can be interpolated to every spatial location and fulfill every grid point in a 3D cube. One interpolation method is to smooth the velocities along horizontal directions. However, such horizontal smoothing can intersect with structures or subsurface interfaces, and as a result degrade accuracy of the interpolated velocities with respect to the underground structures. Therefore, it is desired to smooth the velocities along structures to provide improved interpolated velocity results.

At a high level, the described approach provides an approximation method to interpolate, extrapolate, or interpolate and extrapolate sparsely sampled velocity values into fully-populated grid points of a 3D velocity cube under the guidance of structures in seismic image(s). The described approximation method spreads velocity values sparsely sampled at arbitrary locations to their vicinity grids along structure trends shown in seismic image(s). A mask for the 3D velocity cube is introduced. Values in the mask are set to one where the input velocities (i.e., sparsely sampled velocity values) are defined, and to zero otherwise. Identical structure oriented smoothing (SOS) operations are applied to both the sparsely defined velocities and the mask. Finally, an interpolated velocity cube is produced by point-to-point dividing of the smoothed velocities over the smoothed mask. The interpolated velocity cube is fully populated at every grid point in the 3D cube.

The velocity interpolation workflow includes a structure oriented smoothing (SOS). The SOS algorithm can be formulated by an anisotropic diffusion equation. Diffusion is a physical process that involves the net movement of molecules or atoms from a region of high concentration (or high chemical potential) to a region of low concentration (or low chemical potential). In the present disclosure, velocity is diffused from a location where the velocity is defined (e.g., a CDP location where a user picked up a velocity spectrum) to other locations where the velocity is not defined (e.g., CDP locations where the user didn't pick up a velocity spectrum). The anisotropic diffusion equation can be expressed as:

$$\frac{\partial u}{\partial \tau} = \nabla(D \cdot \nabla u) \quad (1)$$

where $\tau$ indicates the time for smoothing, u represents the parameter to be diffused, and D is an important parameter called diffusion coefficient. D controls how the energy (e.g., defined velocity) flows and the direction for smoothing. In the present disclosure, D is represented by structure tensors.

After the SOS is implemented by a diffusion process, the workflow of the image-guided velocity interpolation method can be implemented by the following steps:

1. Compute the structure tensors D from inputted seismic image(s);
2. Assign known velocity values (e.g., the sparsely sampled velocity values) to a 3D array of $u_0$, and set $u_0$'s values to zero where velocity does not exist (e.g., at locations where velocity is not sampled). The 3D array of $u_0$ contains nonzero values at locations where velocity is provided. Using the 3D $u_0$ cube as an initial condition, the diffusion equation (e.g., Equation (1)) can be solved for a pre-determined number of steps to obtain diffused u. The diffused u contains the diffused velocities;
3. Create an initial mask $m_0$=sign(abs($u_0$)), where m equals to one at a location where input velocity exists, and to zero otherwise. The mask $m_0$ is diffused by the identical smoothing process applied to $u_0$ in step 2 above. After the diffusion of $m_0$, the diffused mask m is obtained;
4. The final smoothed velocity is obtained by point-to-point dividing of the diffused u over m.

In some implementations, to avoid the singularity issue, directionless Gaussian smoothing is applied to the initial $u_0$ and $m_0$ first in steps 2 and 3, respectively. The respective results after the directionless Gaussian smoothing are used as input for solving the diffusion equation in steps 2 and 3.

The example image-guided velocity interpolation method, described in the present disclosure, can achieve one or more advantages. First, the example image-guided velocity interpolation method can automatically interpolate input velocity defined at arbitrary locations. Second, the example image-guided velocity interpolation method uses an anisotropic diffusion equation, which is easier and more feasible to implement than other equations (e.g., an eikonal equation, a blended equation). In some applications, the example image-guided velocity interpolation method can achieve additional or different advantages.

FIG. 1 illustrates an example seismic image 100 for image-guided velocity interpolation, according to some implementations. As illustrated in FIG. 1, the example seismic image 100 shows the underground structures that can affect the accuracy of interpolated velocities. Although FIGS. 1-3 refer to the 2D images for purposes of example, the subject matter of this document can be applied to the 3D images.

Figure 2:
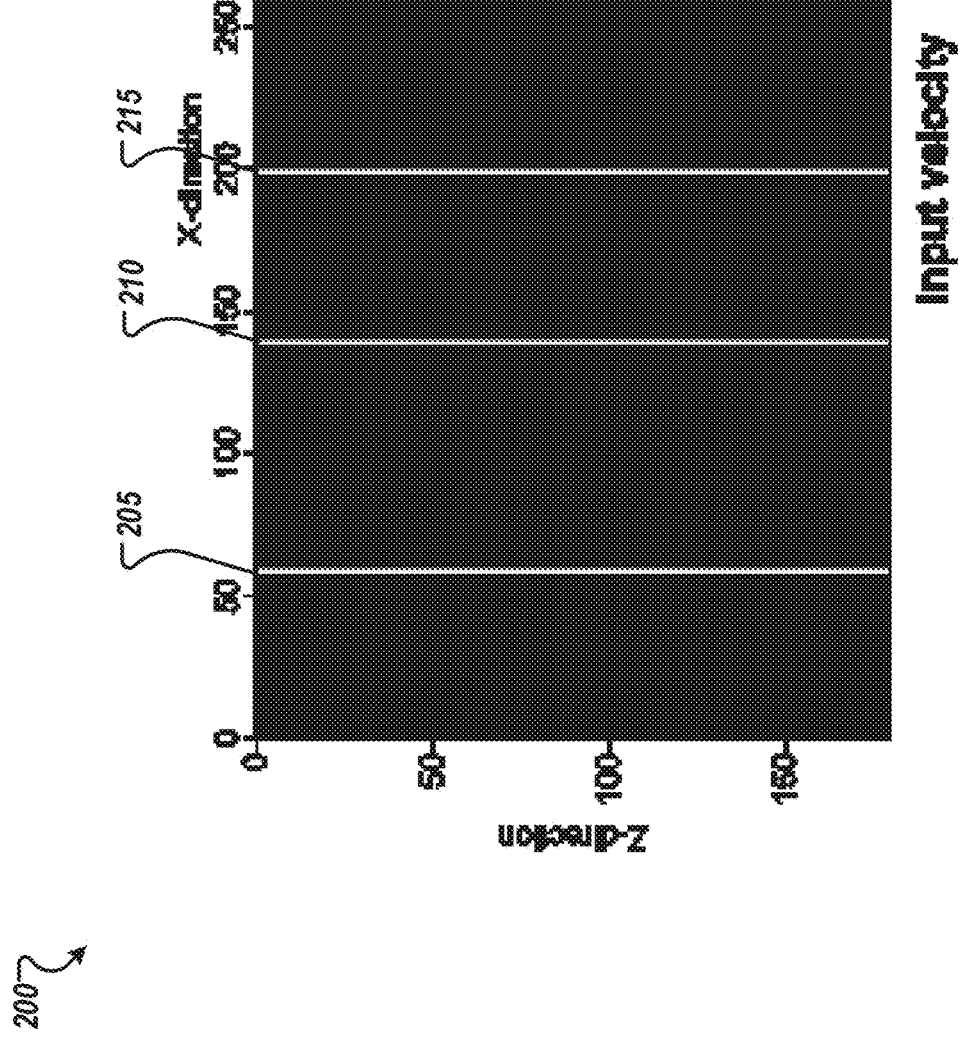
FIG. 2 illustrates an example image showing four initial input velocity lines for image-guided velocity interpolation, according to some implementations.

FIG. 2 illustrates an example image 200 showing four initial input velocity lines for image-guided velocity interpolation, according to some implementations. For example, the velocity model is a Sigsbee model. As illustrated in FIG. 2, four verticals lines (i.e., lines 205, 210, 215, and 220) at four arbitrary x locations (i.e., 60, 140, 200, and 300) from the Sigsbee model are extracted as initial velocity values to be interpolated to other x locations. For the structural smoothing method, the velocity values along the four vertical lines are assigned as known velocity values to the 3D array of $u_0$, and the velocity values at other locations (i.e., locations not along the four vertical lines) are set to zero to the 3D array of $u_0$. In addition, values of the corresponding $m_0$ are set to one along the four vertical lines, and to zero at other locations (i.e., locations not along the four vertical lines).

Figure 3:
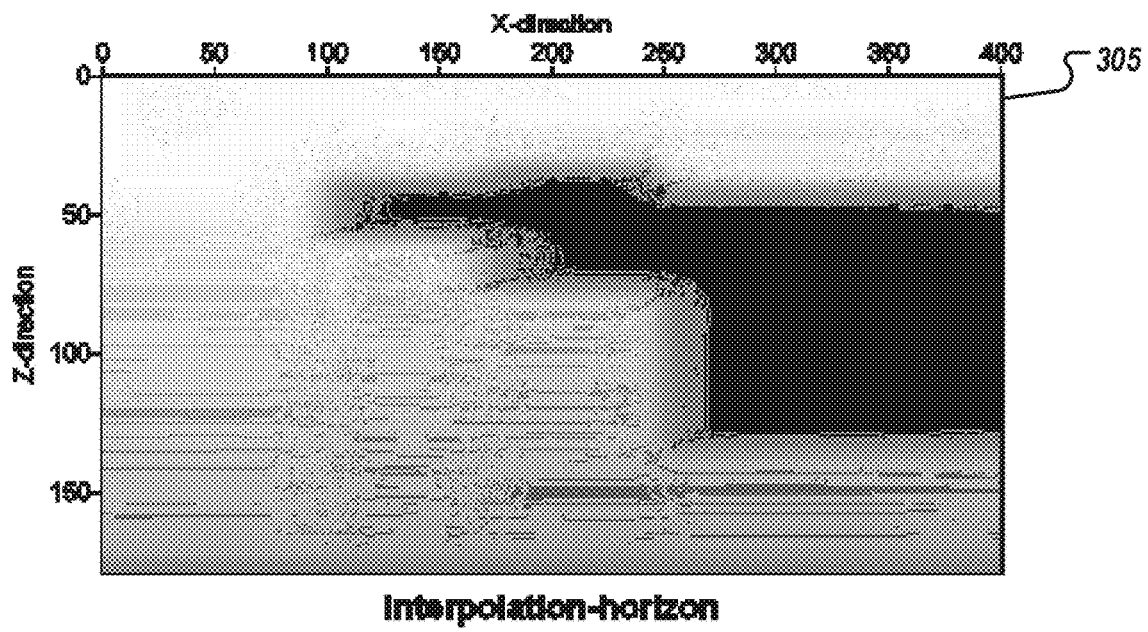
FIG. 3 illustrates example images shown interpolated velocity results along horizontal directions and interpolated velocity results along structural features, according to some implementations.
Figure 3:
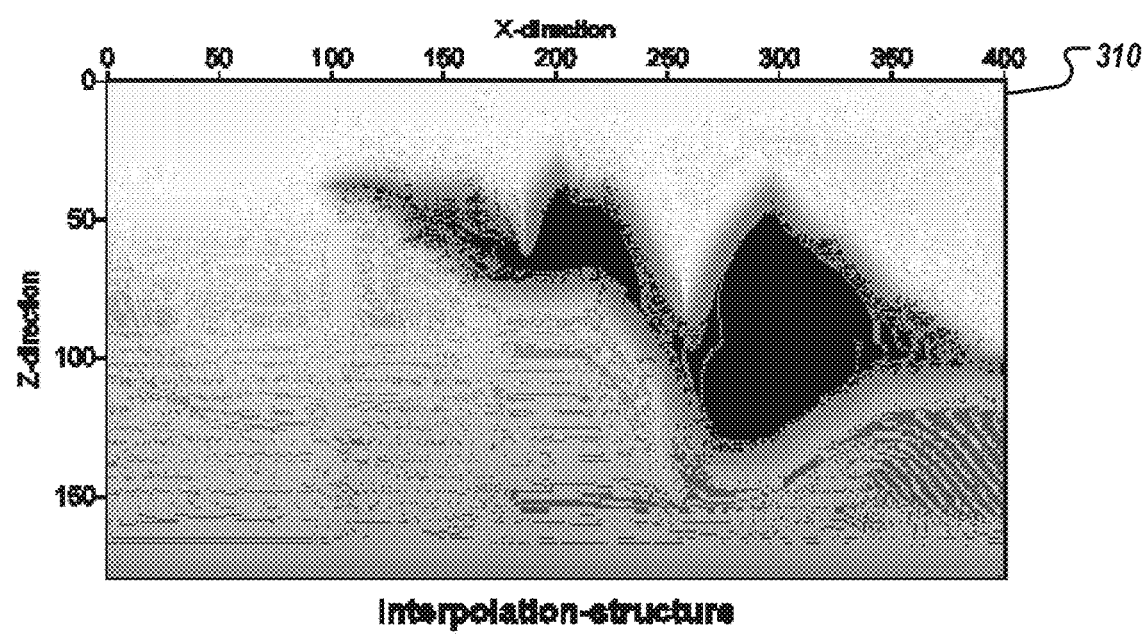

FIG. 3 illustrates example images 300 shown interpolated velocity results 305 along horizontal directions and interpolated velocity results 310 along structural features, according to some implementations. In FIG. 3, the interpolated velocity results 305 using horizontal smoothing is shown on the top. The results 305 show that the shape of the interpolated velocity results is inconsistent with respect to the underground structures. The interpolated velocity results 310 using the described structural smoothing method is shown on the bottom of FIG. 3. The Sigsbee model is used to compute the structure tensors in the structural smoothing method. The results 310 show that the shape of the interpolated velocity results is consistent with the Sigsbee model, and indicate that the structure features are well preserved in the structural smoothing method. As a result, the interpolated velocity results along structural features are more accurate than the interpolated velocity results along horizontal directions.

Figure 4:
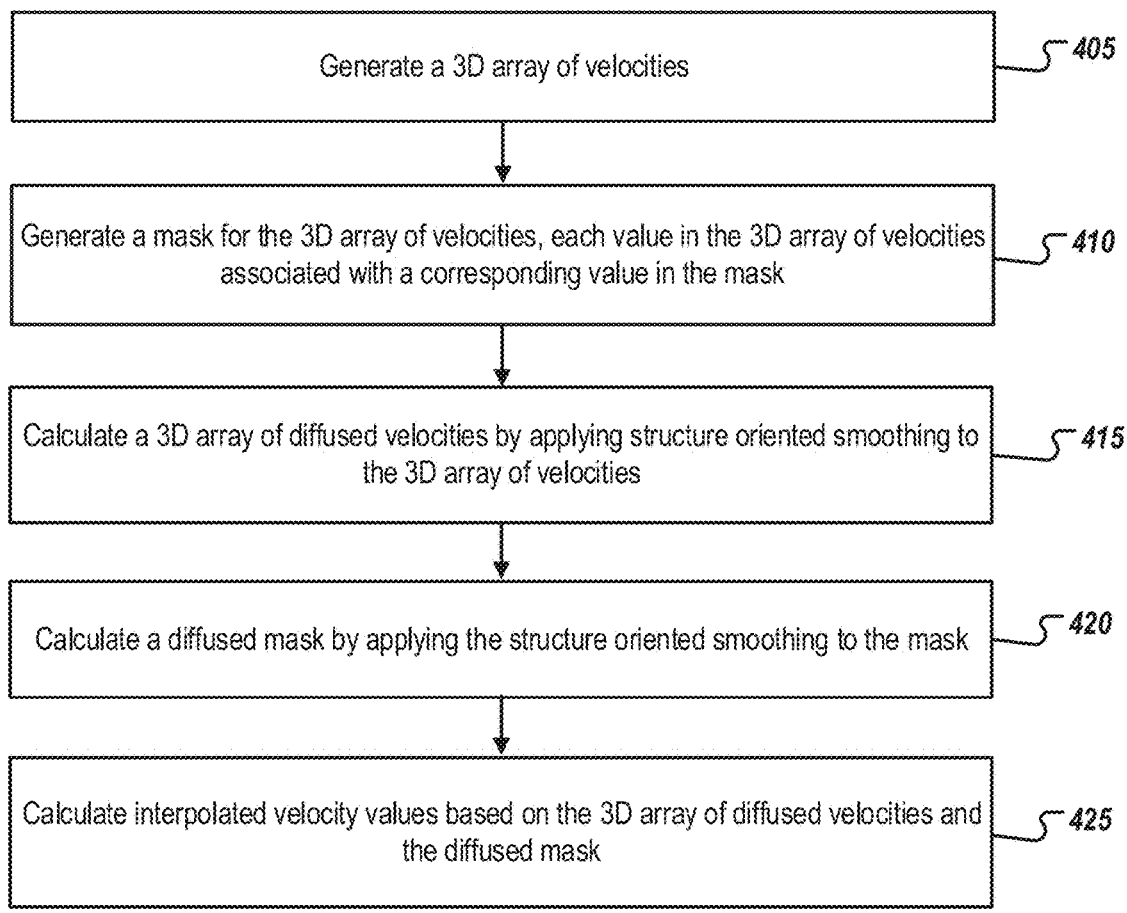
FIG. 4 is a flowchart illustrating an example method for image-guided velocity interpolation using a mask cube, according to some implementations.

FIG. 4 is a flowchart illustrating an example method 400 for image-guided velocity interpolation using a mask cube, according to some implementations. For clarity of presentation, the description that follows generally describes method 400 in the context of the other figures in this description. For example, method 400 can be performed by a computer system described in FIG. 5. However, it will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order. In some implementations, the steps of method 400 can be run automatically.

The method 400 starts at block 405 where a 3D array of velocities (e.g., $u_0$) is generated. In some implementations, the 3D array of velocities is generated based on received sparsely sampled velocity values. For example, values in the 3D array of velocities are set to the received sparsely sampled velocity values at locations where velocity values are sampled. Values in the 3D array of velocities are set to zero at locations where velocity values are not sampled.

At block 410, a mask (e.g., $m_0$) for the 3D array of velocities (e.g., $u_0$) is generated. In some implementations, the mask has the same dimensions as the 3D array of velocities. For example, each value in the 3D array of velocities has a corresponding value in the mask. In some implementations, $m_0 = \text{sign}(\text{abs}(u_0))$. For example, a value in the mask is set to zero when a corresponding value in the 3D array of velocities is zero, or to one when the corresponding value in the 3D array of velocities is not zero.

At block 415, a 3D array of diffused velocities (e.g., u) is calculated. The calculation is performed by applying structure oriented smoothing to the 3D array of velocities (e.g., $u_0$). In some implementations, the structure oriented smoothing includes solving an anisotropic diffusion equation (e.g., Equation (1)) based on structure tensors (e.g., D). The structure tensors are calculated from one or more seismic images associated with underground structures. In some implementations, to avoid the singularity issue, directionless Gaussian smoothing is applied to the 3D array of velocities (e.g., $u_0$) first. The results after the directionless Gaussian smoothing (e.g., instead of $u_0$) are used as input to the anisotropic diffusion equation for calculating the 3D array of diffused velocities.

At block 420, a diffused mask (e.g., m) is calculated. The diffused mask is calculated by applying to the mask (e.g., $m_0$) the same structure oriented smoothing applied to the 3D array of velocities as in block 415. In some implementations, the same structure oriented smoothing operations are applied to both the 3D array of velocities and the mask simultaneously or substantially simultaneously. In some implementations, to avoid the singularity issue, directionless Gaussian smoothing is applied to the mask (e.g., $m_0$) first. The results after the directionless Gaussian smoothing (e.g., instead of $m_0$) are used as input to the anisotropic diffusion equation for calculating the diffused mask.

At block 425, interpolated velocity values are calculated based on the 3D array of diffused velocities (e.g., u) and the diffused mask (e.g., m). In some implementations, the interpolated velocity values (e.g., the final smoothed velocities) are calculated by point-to-point dividing of the 3D array of diffused velocities over the diffused mask. For example, if the 3D array of diffused velocities is $u_{z,x,y}$ and the diffused mask is $m_{z,x,y}$ with the same (z, x, y) dimensions, the interpolated velocity values are calculated as $u(i_z, i_x, i_y)/m(i_z, i_x, i_y)$ for each spatial index $(i_z, i_x, i_y)$.

The example method 400 shown in FIG. 4 can be modified or reconfigured to include additional, fewer, or different steps (not shown in FIG. 4), which can be performed in the order shown or in a different order. For example, before block 405, one or more seismic images are received as input to calculate structure tensors used in solving the anisotropic diffusion equation. In addition, before block 405, sparsely sampled velocity values at particular locations are received as initial input to the 3D array of velocities. In some implementations, one or more of the steps shown in FIG. 4 can be repeated or iterated, for example, until a terminating condition is reached. In some implementations, one or more of the individual steps shown in FIG. 4 can be executed as multiple separate steps, or one or more subsets of the steps shown in FIG. 4 can be combined and executed as a single step. In some implementations, one or more of the individual steps shown in FIG. 4 may also be omitted from the example method 400.

Figure 5:
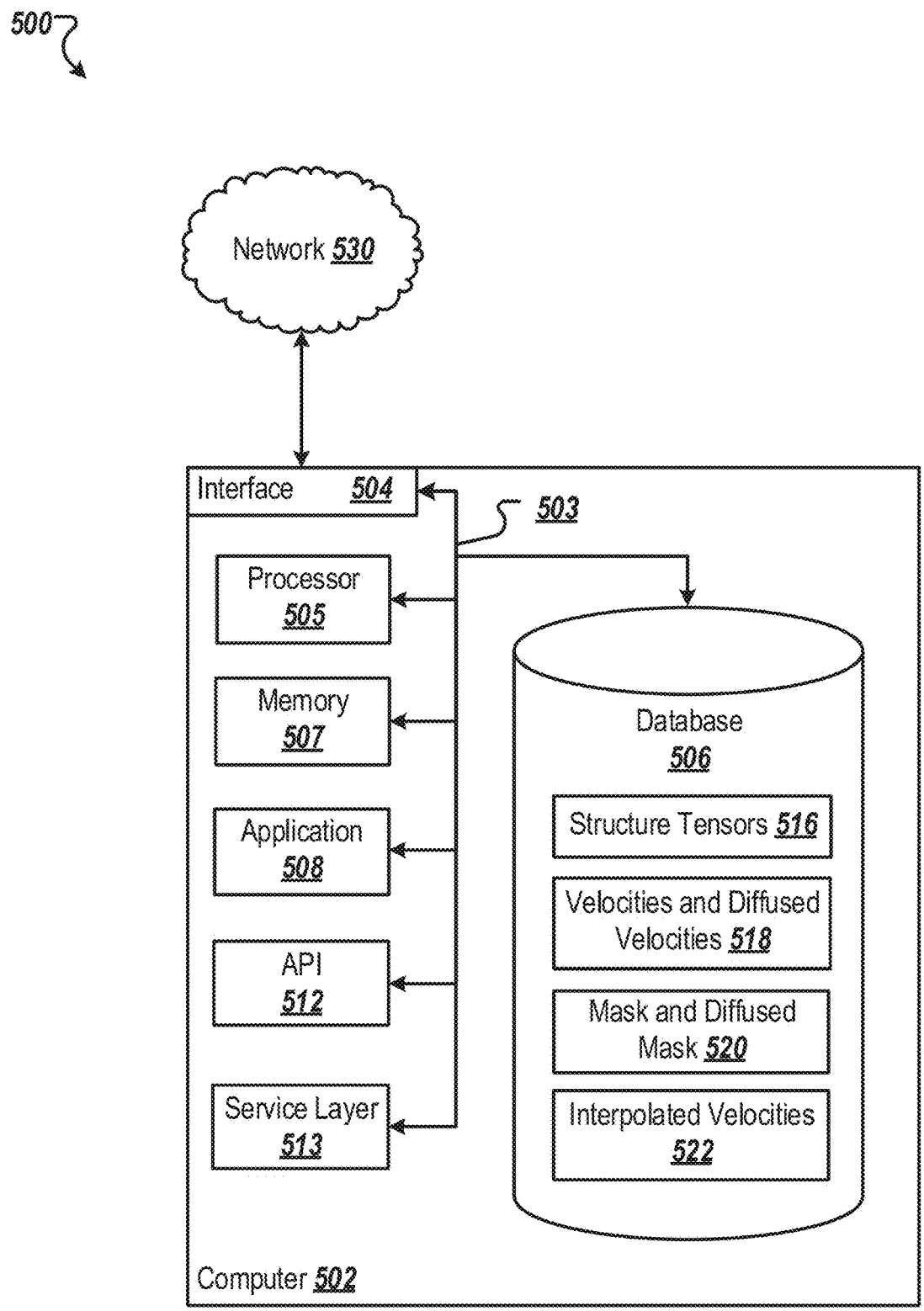
FIG. 5 is a block diagram illustrating an example computer system used to provide computational functionalities associated with described algorithms, methods, functions, processes, flows, and procedures as described in the instant disclosure, according to some implementations.

FIG. 5 is a block diagram of an example computer system 500 used to provide computational functionalities associated with described algorithms, methods, functions, processes, flows, and procedures as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other server (or a combination of servers).

The computer 502 can receive requests over network 530 from a client application (for example, executing on another computer) and respond to the received requests by processing the received requests using the appropriate software application(s). In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and may refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module, without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems that are connected to the network 530 (whether illustrated or not) in a distributed environment. Generally, the interface 504 comprises logic encoded in software or hardware (or a combination of software and hardware) and is operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502. As illustrated, the database 506 holds, for example, structure tensors 516, velocities and diffused velocities 518, mask and diffused mask 520, and interpolated velocities 522.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like, storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or a combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, or applications. Further, although illustrated as a single application 508, the application 508 may be implemented as multiple applications 508 on the computer 502. In addition, although illustrated as integral to the computer 502, in alternative implementations, the application 508 can be external to the computer 502.

There may be any number of computers 502 associated with, or external to, a computer system containing computer 502, each computer 502 communicating over network 530. Further, the term "client", "user", and other appropriate terminology may be used interchangeably, as appropriate, without departing from the scope of this disclosure. Moreover, this disclosure contemplates that many users may use one computer 502, or that one user may use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or be described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20, or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A method comprising:
receiving, by one or more hardware processors, sampled velocity values, wherein each sampled velocity value is sampled at a corresponding location in earth subsurface layers;
automatically generating, by the one or more hardware processors, a 3D array of velocities, wherein the 3D array of velocities is generated based on the sampled velocity values, wherein values in the 3D array of velocities are set to the sampled velocity values at locations where velocity values are sampled, and wherein values in the 3D array of velocities are set to zero at locations where velocity values are not sampled;
automatically generating, by the one or more hardware processors, a mask for the 3D array of velocities, wherein each value in the 3D array of velocities is associated with a corresponding value in the mask;
automatically calculating, by the one or more hardware processors, a 3D array of diffused velocities by applying structure oriented smoothing to the 3D array of velocities;
automatically calculating, by the one or more hardware processors, a diffused mask by applying the structure oriented smoothing to the mask;
automatically calculating, by the one or more hardware processors, interpolated velocity values based on the 3D array of diffused velocities and the diffused mask, wherein the interpolated velocity values are calculated by point-to-point dividing of the 3D array of diffused velocities over the diffused mask; and
generating, by the one or more hardware processors, an image of the earth subsurface layers based on the calculated interpolated velocity values.

2. The method of claim 1, further comprising:
receiving one or more seismic images; and
calculating structure tensors from the one or more seismic images.

3. The method of claim 2, wherein the structure oriented smoothing comprises solving an anisotropic diffusion equation based on the calculated structure tensors.

4. The method of claim 1, wherein a value in the mask is set to zero when a corresponding value in the 3D array of velocities is zero, or to one when the corresponding value in the 3D array of velocities is not zero.

5. A device comprising:
a memory; and
a processor arranged to perform operations including:

receiving sampled velocity values, wherein each sampled velocity value is sampled at a corresponding location in earth subsurface layers;

automatically generating a 3D array of velocities, wherein the 3D array of velocities is generated based on the sampled velocity values, wherein values in the 3D array of velocities are set to the sampled velocity values at locations where velocity values are sampled, and wherein values in the 3D array of velocities are set to zero at locations where velocity values are not sampled;

automatically generating a mask for the 3D array of velocities, wherein each value in the 3D array of velocities is associated with a corresponding value in the mask;

automatically calculating a 3D array of diffused velocities by applying structure oriented smoothing to the 3D array of velocities;

automatically calculating a diffused mask by applying the structure oriented smoothing to the mask;

automatically calculating interpolated velocity values based on the 3D array of diffused velocities and the diffused mask, wherein the interpolated velocity values are calculated by point-to-point dividing of the 3D array of diffused velocities over the diffused mask; and generating an image of the earth subsurface layers based on the calculated interpolated velocity values.

6. The device of claim 5, the operations further comprising:
   receiving one or more seismic images; and
   calculating structure tensors from the one or more seismic images.

7. The device of claim 6, wherein the structure oriented smoothing comprises solving an anisotropic diffusion equation based on the calculated structure tensors.

8. The device of claim 5, wherein a value in the mask is set to zero when a corresponding value in the 3D array of velocities is zero, or to one when the corresponding value in the 3D array of velocities is not zero.

9. A non-transitory computer-readable medium storing instructions executable by a computer system to perform operations comprising:
   receiving sampled velocity values, wherein each sampled velocity value is sampled at a corresponding location in earth subsurface layers;
   automatically generating a 3D array of velocities, wherein the 3D array of velocities is generated based on the sampled velocity values, wherein values in the 3D array of velocities are set to the sampled velocity values at locations where velocity values are sampled, and wherein values in the 3D array of velocities are set to zero at locations where velocity values are not sampled;
   automatically generating a mask for the 3D array of velocities, wherein each value in the 3D array of velocities is associated with a corresponding value in the mask;
   automatically calculating a 3D array of diffused velocities by applying structure oriented smoothing to the 3D array of velocities;
   automatically calculating a diffused mask by applying the structure oriented smoothing to the mask;
   automatically calculating interpolated velocity values based on the 3D array of diffused velocities and the diffused mask, wherein the interpolated velocity values are calculated by point-to-point dividing of the 3D array of diffused velocities over the diffused mask; and
   generating an image of the earth subsurface layers based on the calculated interpolated velocity values.

10. The medium of claim 9, the operations further comprising:
    receiving one or more seismic images; and
    calculating structure tensors from the one or more seismic images.

11. The medium of claim 10, wherein the structure oriented smoothing comprises solving an anisotropic diffusion equation based on the calculated structure tensors.

12. The medium of claim 9, wherein a value in the mask is set to zero when a corresponding value in the 3D array of velocities is zero, or to one when the corresponding value in the 3D array of velocities is not zero.

* * * * *